(12) United States Patent
Jaworowski et al.

(10) Patent No.: US 11,745,278 B2
(45) Date of Patent: Sep. 5, 2023

(54) ELECTRICAL DISCHARGE MACHINING SYSTEM INCLUDING IN-SITU TOOL ELECTRODE

(71) Applicant: Hamilton Sundstrand Corporation, Charlotte, NC (US)

(72) Inventors: Mark R. Jaworowski, Sarasota, FL (US); Eric W. Karlen, Rockford, IL (US); Gary M. Lomasney, Glastonbury, CT (US); Sergey Mironets, Charlotte, NC (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 302 days.

(21) Appl. No.: 17/074,715

(22) Filed: Oct. 20, 2020

(65) Prior Publication Data

US 2021/0031286 A1 Feb. 4, 2021

Related U.S. Application Data

(62) Division of application No. 15/802,312, filed on Nov. 2, 2017, now Pat. No. 10,870,159.

(51) Int. Cl.
*B23H 1/06* (2006.01)
*B23H 7/34* (2006.01)
(Continued)

(52) U.S. Cl.
CPC ............... *B23H 1/06* (2013.01); *B23H 7/34* (2013.01); *B23H 9/14* (2013.01); *B23H 11/00* (2013.01);
(Continued)

(58) Field of Classification Search
CPC ... B23H 1/04; B23H 1/06; B23H 7/22; B23H 7/24; B23H 7/32; B23H 9/001;
(Continued)

(56) References Cited

U.S. PATENT DOCUMENTS 3,838,188 A    9/1974  Farrell
5,332,529 A *  7/1994  Mead ................. H01B 3/20
                                                252/570

(Continued)

FOREIGN PATENT DOCUMENTS

EP    1837114 A1    9/2007
FR    3037974 A1   12/2016
JP  2001105235 A    4/2001

OTHER PUBLICATIONS

Anil Kumar, et al.; "Realizing Potential of Graphite Powder in Enhancing Machining Rate in AEDM of Nickel Based Super Alloy 718"; Proc. of. Int. Conf. on Advances in Mechanical Engineering; 2010; 4 pages.

(Continued)

*Primary Examiner* — Justin C Dodson
(74) *Attorney, Agent, or Firm* — CANTOR COLBURN LLP (57) ABSTRACT

An additive manufactured workpiece includes one or more cavities having an inner surface. A dielectric interface is formed in the cavity, and conforms to the inner surface. The additive manufactured workpiece further includes an in-situ (Continued)

electrode in the cavities. The dielectric interface is interposed between the in-situ electrode and the inner surface of the workpiece.

5 Claims, 9 Drawing Sheets

(51) Int. Cl.
    *B23H 11/00*     (2006.01)
    *B23H 9/14*     (2006.01)
    *B23H 7/32*     (2006.01)
    *B33Y 80/00*     (2015.01)
    *B22F 3/24*     (2006.01)
    *B22F 10/00*     (2021.01)

(52) U.S. Cl.
    CPC ......... *B22F 10/00* (2021.01); *B22F 2003/247* (2013.01); *B23H 7/32* (2013.01); *B33Y 80/00* (2014.12)

(58) Field of Classification Search
    CPC . B23H 9/14; B23H 11/00; H05B 7/00; H05B 7/06; H05B 7/144; H05B 7/148; B33Y 80/00
    See application file for complete search history.

(56) References Cited

U.S. PATENT DOCUMENTS

| | | |
|---|---|---|
| 5,728,345 A | 3/1998 | Hlavaty |
| 2006/0065546 A1* | 3/2006 | Curodeau ............... B82Y 30/00 |
| | | 205/640 |
| 2012/0114868 A1 | 5/2012 | Bunker |
| 2014/0061164 A1* | 3/2014 | Zahn ....................... B05B 7/224 |
| | | 219/69.11 |
| 2015/0096960 A1 | 4/2015 | Crawford et al. |
| 2015/0273600 A1 | 10/2015 | Ozkeskin |
| 2015/0321277 A1* | 11/2015 | Regenass ................. B23H 1/08 |
| | | 252/575 |
| 2016/0052057 A1 | 2/2016 | Xu |
| 2016/0234890 A1* | 8/2016 | De Samber ............. H02J 50/05 |
| 2017/0054191 A1* | 2/2017 | Williams ................. H01P 3/06 |
| 2018/0193920 A1 | 7/2018 | Vollebregt et al. |
| 2019/0024251 A1* | 1/2019 | Li ............................ C25D 1/02 |

OTHER PUBLICATIONS

Search Report for European Application No. 18203704.4; Application Filing Date Oct. 31, 2018; dated Apr. 8, 2019 (8 pages).

* cited by examiner

FIG. 9

ELECTRICAL DISCHARGE MACHINING SYSTEM INCLUDING IN-SITU TOOL ELECTRODE

CROSS-REFERENCE TO RELATED APPLICATIONS

This application is a division of U.S. application Ser. No. 15/802,312, filed Nov. 2, 2017, the contents of which are hereby incorporated by reference in its entirety.

BACKGROUND

Exemplary embodiments pertain to the art of structure component fabrication, and more particularly, to electrical discharge machining (EDM).

Electric discharge machining, or "EDM," is an established method and apparatus utilized for machining metal. The process operates through the utilization of an electrical discharge to remove metal from the workpiece. In the EDM process, an electrode is brought into close proximity to the workpiece surrounded by a dielectric fluid, and voltage is applied in pulses at high frequency. The dielectric interface creates sparking at generally the closest position between the workpiece and the electrode. Particles are removed from the workpiece when sparking interacts with the workpiece (e.g., when the electrical sparking is quenched).

BRIEF DESCRIPTION

According to a non-limiting embodiment, an additive manufactured workpiece includes one or more cavities having an inner surface. A dielectric interface is formed in the cavity, and conforms to the inner surface. The additive manufactured workpiece further includes an in-situ electrode in the cavities. The dielectric interface is interposed between the in-situ electrode and the inner surface of the workpiece.

According to another non-limiting embodiment, a method is provided to improve an internal surface topography of a manufactured workpiece. The method comprises forming a dielectric interface between an in-situ electrode located in at least one cavity of the workpiece and a rough inner surface of the at least one cavity, and flowing an electrical current through the in-situ electrode. The method further comprises inducing an electrical discharge across the dielectric interface, and removing irregularities from the rough surface via the electrical discharge across so as to convert the rough surface into a smoothened inner surface having a reduced number of irregularities.

BRIEF DESCRIPTION OF THE DRAWINGS

The following descriptions should not be considered limiting in any way. With reference to the accompanying drawings, like elements are numbered alike.

FIGS. 2-9 are a series of views illustrating a process flow to improve the finish of an inner surface of a cavity included in a workpiece according to exemplary embodiments of the present teachings, in which:

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

Although AM is capable of fabricating end-use products such as heat exchanges, conventional AM techniques and conventional EDM techniques may fabricate components having poor internal surface finishes. When considering fabricated heat exchangers, for example, poor internal surface finishes can cause excessive pressure drops, which compromise the AM heat exchanger's cooling efficiency. Conventional EDM techniques may also cause asperities and excessive surface roughness that may increase component stress points. The increased stress points can increase structural fatigue, thereby reducing the operating life of the fabricated device.

Various non-limiting embodiments of the disclosure provide an AEDM system including an in-situ tool electrode. The in-situ tool electrode operates in conjunction with an injected additive. For example, the additive may include, for example, a graphite material. The graphite material can increase interspaces for electric discharge initiation and while reducing the breakdown strength of dielectric fluid. Accordingly, forming the in-sit electrode from a graphite material can increase the machining rate along with improving machining stability. The graphite material may include a dry graphite powder which can be pressurized to increase the total contact area with internal surfaces of the workpiece that are exposed via a worked cavity (i.e., formed using the in-situ AEDM tool electrode).

In another embodiment, the additive can include a suspension containing fine graphite particles which can be used if the internal cavities are too narrow for dry graphite powder to flow due to a bridging effect. After the graphite suspension is injected to build up (i.e., fill) the cavities, the delivery suspension is evaporated leaving graphite particles that fill the cavities, some of which may also be deposited on the surface of the workpiece. A fluid-swelling or porous polymer film can be considered to function as a dielectric barrier and as a polyelectrolyte to enhance the graphite media adherence to the workpiece surfaces. In either case described above, the remaining deposited graphite serves as an electrode suspended in the dielectric fluid for enhancing the capabilities of the AEDM process.

Figure 1:
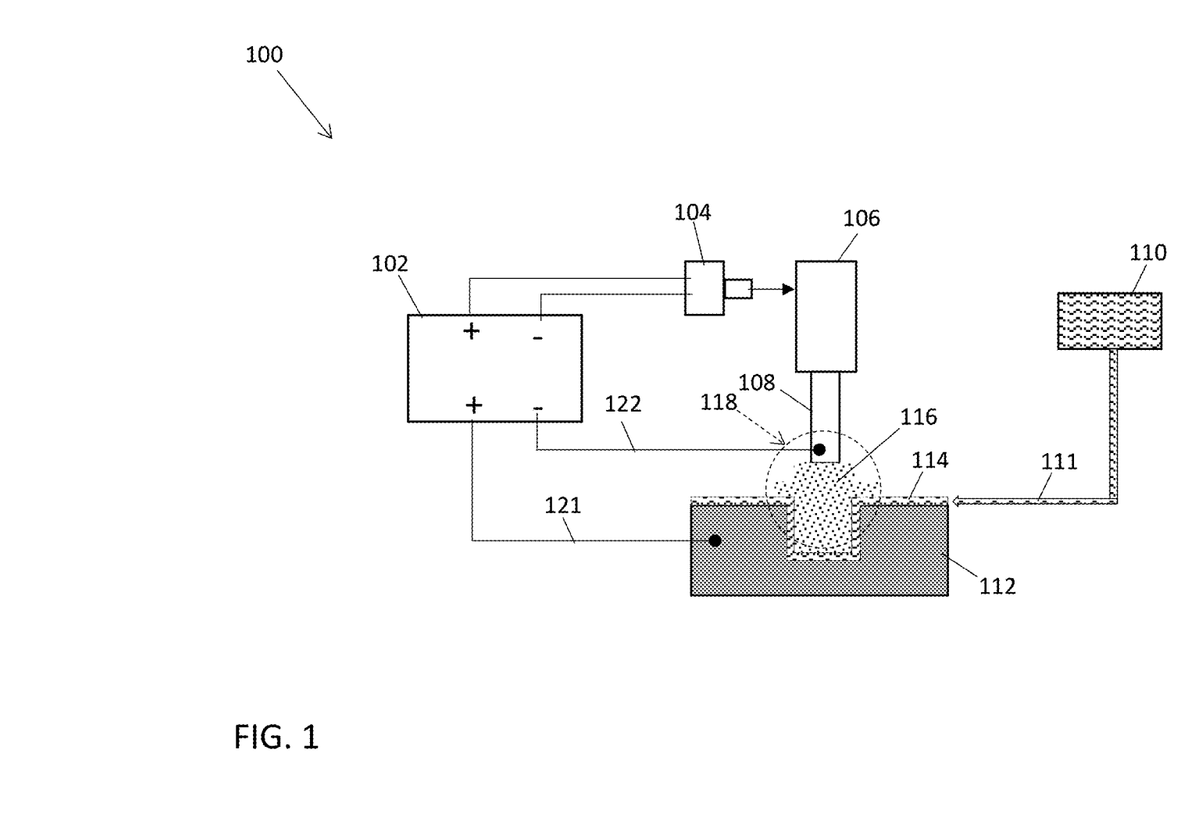
FIG. 1 is a block diagram of an AEDM system including an in-situ tool electrode according to a non-limiting embodiment.

Turning now to FIG. 1, an AEDM system 100 is illustrated according to a non-limiting embodiment. The AEDM system 100 includes a power supply 102, a servo mechanism 104, a moveable tool 106, a tool electrode 108, and a dielectric fluid source 110. The moveable tool 106 and a tool electrode 108 operate to perform a surface finish improvement process that improves the topography (e.g., smoothens or polishes) of a workpiece 112, especially the inner surfaces of crevices and cavities included on the workpiece 112 which cannot be directly accessed by the tool electrode 108. The workpiece 112 can be formed from various materials such as, for example, a metal material. In at least one non-limiting embodiment, the workpiece 112 is composed of a nickel-based super alloy such as, for example, Inconel 718.

Prior to performing the surface finish improvement process, a conformal porous film 114 and an in-situ electrode 116 are formed in one or more target areas (e.g., crevices or cavities) to provide the tool electrode 108 with access to the inner surface and sidewalls. The porous film 114 stores a dielectric fluid 111, and lines the inner surface of the target area (e.g., cavity). The pours film 114 can be composed of a polymer material such as, for example, cross-linked, non-ionic hydrophobic polymers and polymer gels, and hydrophilic polymers and polymer gels.

In one or more embodiments, the dielectric fluid source 110 delivers a dielectric fluid to the porous film 114, where it is absorbed and stored therein. The dielectric fluid includes, but is not limited to, a liquid hydrocarbon, a silicone oil, ethylene glycol, propylene glycol, polyethylene glycol, glycerol, and deionized water. The in-situ electrode 116 is formed on the porous film 114 containing the dielectric fluid 111 thereby forming a dielectric interface between the in-situ electrode 116 and the workpiece 112. The distance separating the in-situ electrode 116 and the inner surfaces of the workpiece 112 can be set based on a selected thickness of the porous film 114.

After disposing the porous film 114 and the in-situ electrode 116 in the target cavity, the tool electrode 108 is brought into contact with the in-situ electrode 116 (e.g., an accessible upper surface of the in-situ electrode 116). The tool electrode 108 is conductively coupled to the moveable tool 106. The servo mechanism 104 controls the position of the moveable tool 106 so as to maintain contact between the tool electrode 108 and the in-situ electrode 116.

The power supply 102 includes an anode terminal 121 that delivers a positive voltage (+) and a cathode 122 that delivers a negative voltage (−). The workpiece 112 is electrically coupled to the anode terminal 121, while the in-situ electrode 116 is electrically coupled to the cathode terminal 122. In other embodiments, the cathode terminal 122 may be connected directly to the in-situ electrode 116 as discussed below.

The surface finish improvement process is initiated by applying a voltage across the anode terminal 121 and the cathode terminal 122. In at least one embodiment, the voltage induces an electrical charge, which is transferred by way of ionized gas and plasma in conjunction with electron transfer reactions at the surfaces. The dielectric fluid 111 stored in the porous film 114 prevents an electrical short from occurring between the in-situ electrode 116 and the workpiece 112. In one or more embodiments, the dielectric fluid source 110 can continuously flow the dielectric fluid 111 thorough the porous film 114. Although the combination of the porous film 114 and absorbed dielectric fluid 111 prevents an electrical short, an electrical discharge is induced across the porous film 114 which erodes irregularities (e.g., bumps, rough surface elements, etc.) from the inner surface of the cavity. In this manner, the inner surface is polished or smoothened, thereby improving the inner surface topology of the target cavity.

Figure 2:
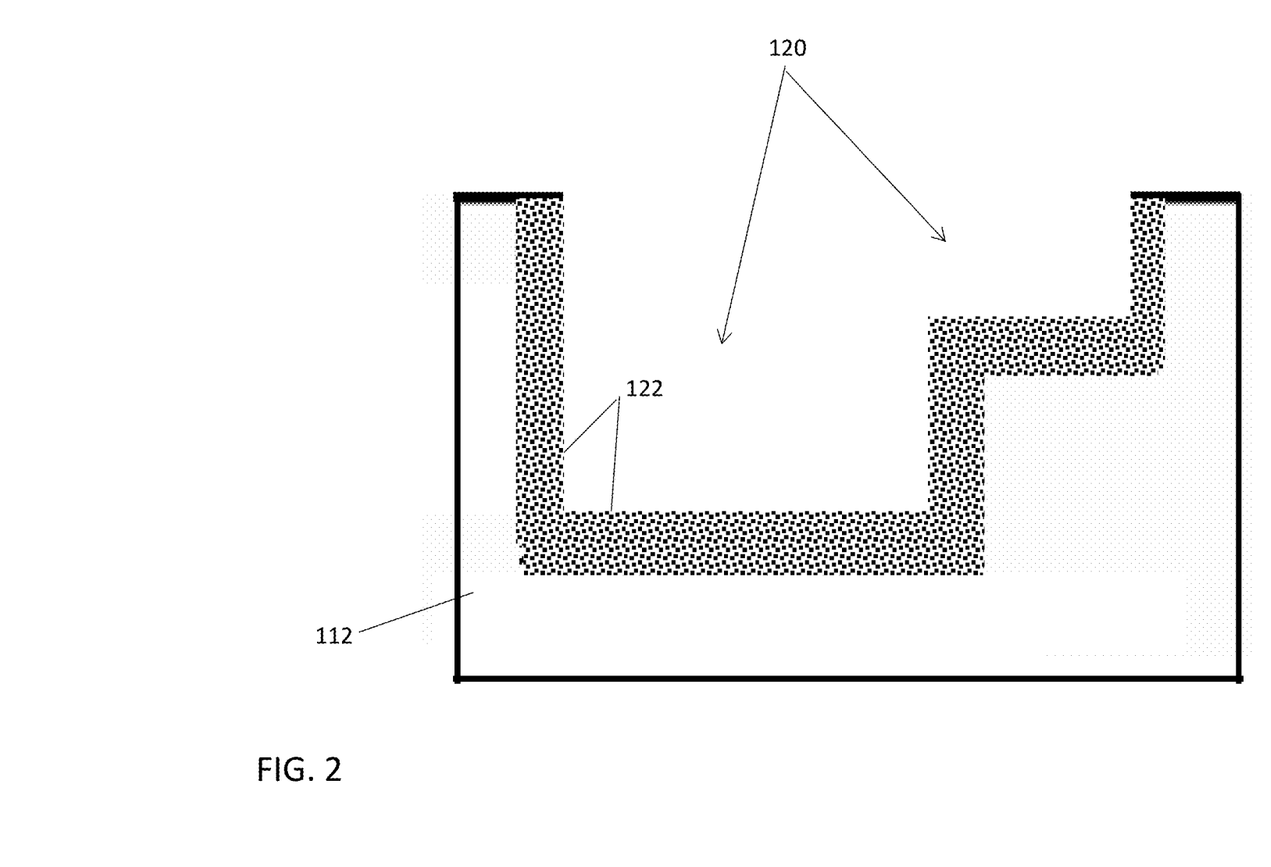
FIG. 2 illustrates a cross-sectional view of a workpiece having one or more cavities with a rough inner-surface according to a non-limiting embodiment.

With reference now to FIGS. 2-9, a process flow to improve the finish of an inner surface of a cavity included in a workpiece 112 is illustrated according to one or more non-limiting embodiments. Referring first to FIG. 2, a workpiece 112 is illustrated including one or more cavities 120 targeted to undergo a surface finish improvement process that improves the topography (e.g., smoothens) of the cavity's rough inner surface 122. Although one target cavity 120 is shown, it should be appreciated that the workpiece 112 can contain several cavities 120 targeted to undergo the surface finish improvement process described herein.

The initial topography of the rough inner surface 122 can be defined by several surface irregularities including raised bumps, and indentations. In at least one embodiment, the roughness of the initial inner surface 122 (i.e., prior to undergoing the surface finish improvement process) can be quantified by deviations in the direction of a normal vector of the inner surface 122 from the inner surface's ideal form. When the deviations exceed a threshold value, for example, the inner surface is deemed to be rough. When, however, the deviations are less than or equal to the threshold value, the inner surface is deemed to be smooth. Accordingly, the surface finish improvement process reduces the initial deviations of the inner surface 122 below a threshold value such that the rough inner surface 122 is deemed smoothened and thus improved. In addition, roughness or smoothness of an inner surface can be determined according to a number of irregularities that are present on the inner surface. As the number of irregularities are removed or eroded away, the rough topography of the inner surface 122 is smoothened, i.e., converted into a smooth surface.

Figure 3:
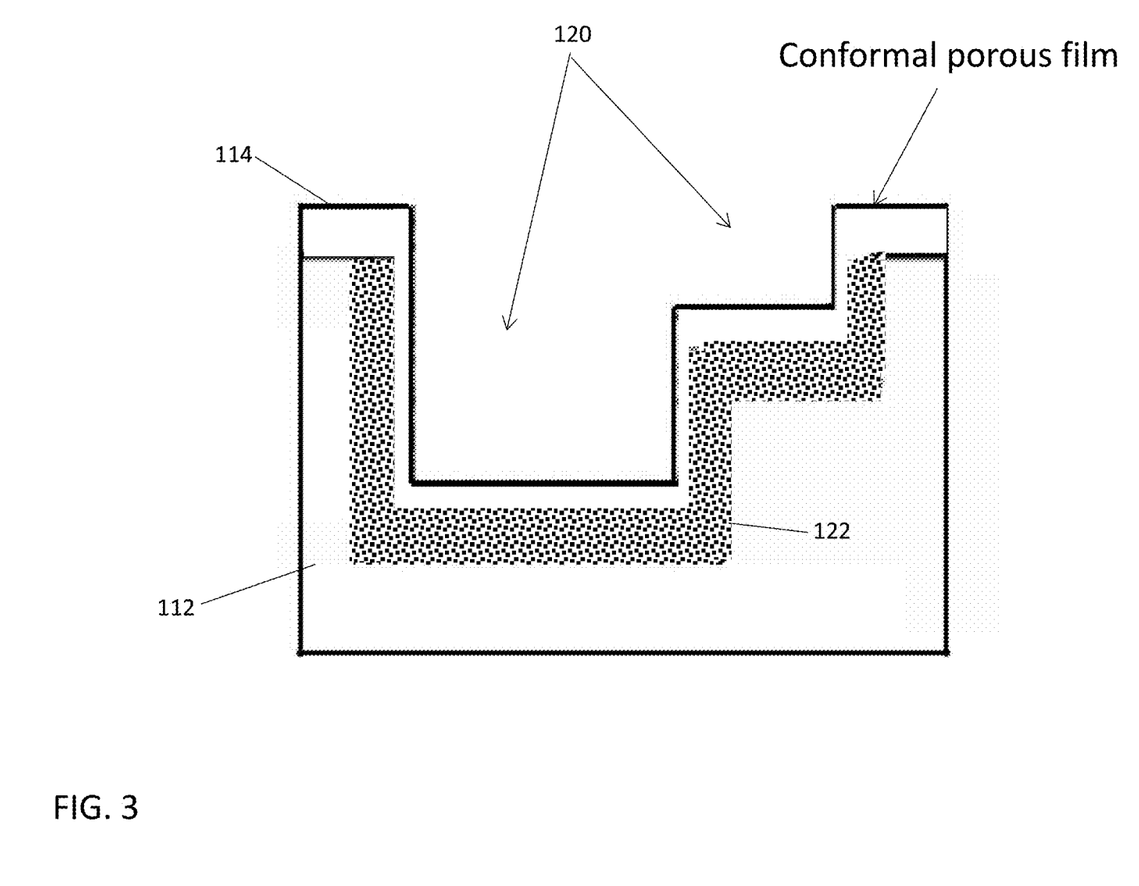
FIG. 3 illustrates the workpiece of FIG. 2 following deposition of a conformal porous film that lines the inner surface of the cavity according to a non-limiting embodiment.

Turning to FIG. 3, the workpiece 112 is illustrated following deposition of a conformal porous film 114 that lines the rough inner surface 122 of the cavity 120. The porous film 114 can be composed of various fluid-swelling or polymer-based materials capable of absorbing a fluid. In one or more embodiments, the porous film 114 can be deposited using, for example, by immersion in a solution of polymer and solvent followed by drying, or by electrophoretic deposition of a polymer emulsion. The porous film 114 can have a thickness ranging, for example, from 1 micron to 100 microns.

Figure 4:
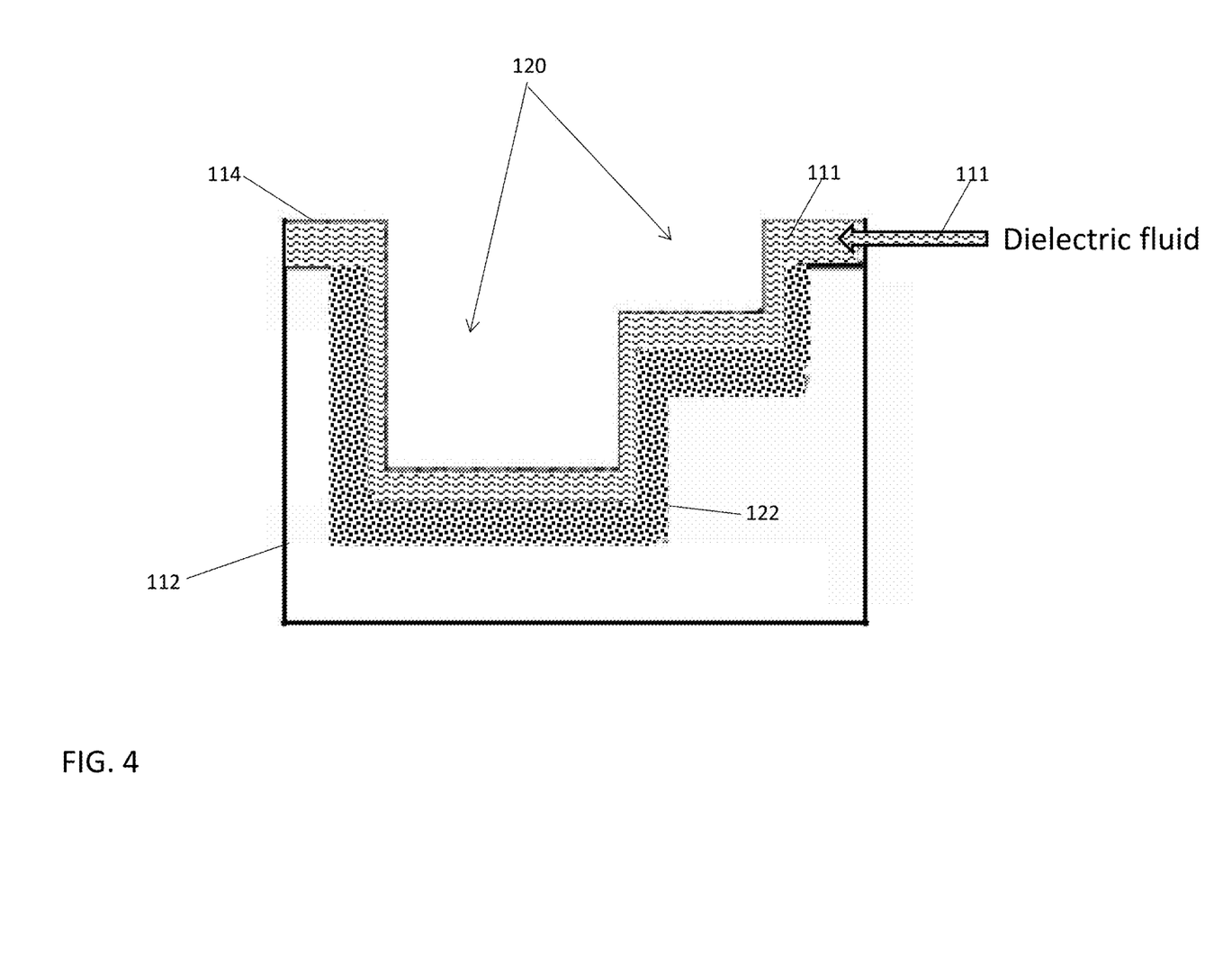
FIG. 4 illustrates the conformal porous film of FIG. 3 after absorbing a dielectric fluid according to a non-limiting embodiment.

Turning to FIG. 4, the conformal porous film 114 is shown after absorbing a dielectric fluid 111. The dielectric fluid 111 can be delivered to the porous film 114 from a fluid source (see FIG. 1). Once in contact with the porous film 114, it is absorbed and stored therein. The dielectric fluid 111 can be composed of a dielectric material contained in an aqueous solution, for example.

Figure 5:
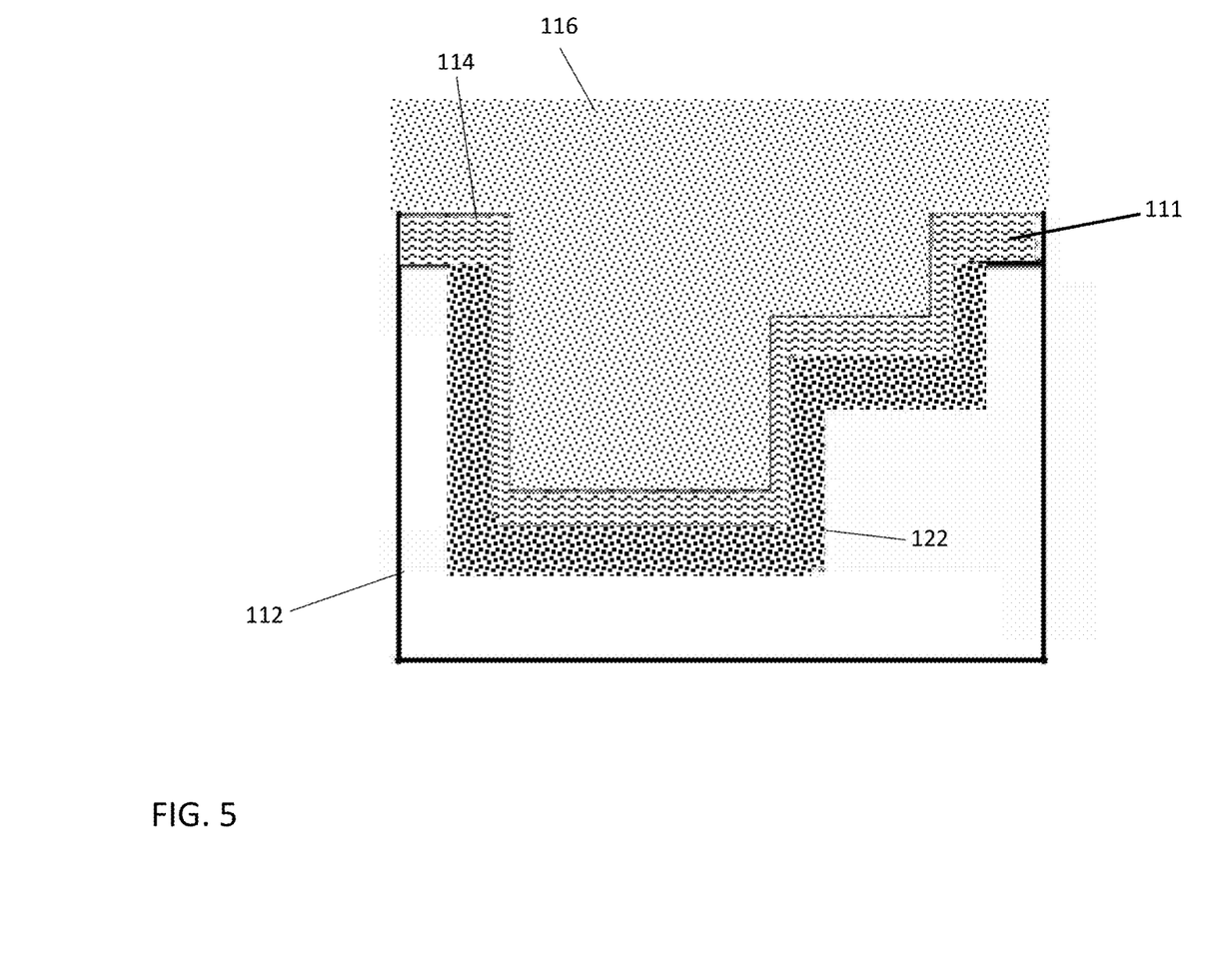
FIG. 5 illustrates the workpiece of FIG. 4 after forming an in-situ electrode in the cavity according to a non-limiting embodiment.

Referring now to FIG. 5, the workpiece 112 is shown after forming an in-situ electrode 116 in the cavity 120. In at least one embodiment, the in-situ electrode 116 is formed by depositing a dry pressurized graphite powder atop the porous film 114 to fill the cavity 120. For example, the dry graphite powder can be pressurized to increase the total contact area within the cavity 120. In at least one embodiment, an annealing process can be performed to harden the graphite powder inside the cavity. In another embodiment, a water soluble binder such as polyvinyl alcohol can be used to adhere the graphite particles into a cohesive, conductive network.

In another embodiment, a suspension with fine graphite particles can be deposited atop the porous film 114 to fill the cavity 120. Once the cavity 120 is filled, the suspension is evaporated while leaving behind the graphite particles in the cavity 120 to form the in-situ electrode 116.

In either embodiment described above, the in-situ electrode 116 is separated from the rough inner surface 122 via the conformal porous film 114. Accordingly, the dielectric fluid 111 contained in the porous film 114 defines a dielectric interface which prevents an electrical short between the in-situ electrode 116 and the rough inner surface 122, while still allowing an electrical discharge across the porous film 114 which erodes irregularities (e.g., bumps, rough surface elements, etc.) from the rough inner surface 122. In addition, the combination of the porous film 114 and absorbed dielectric fluid 111 serves as a polyelectrolyte that enhances electrode material (e.g., graphite) adherence to the rough inner surface 122. The distance separating the in-situ electrode 116 from the rough inner surface 122 can be set according to the thickness of the conformal porous film 114.

Figure 6:
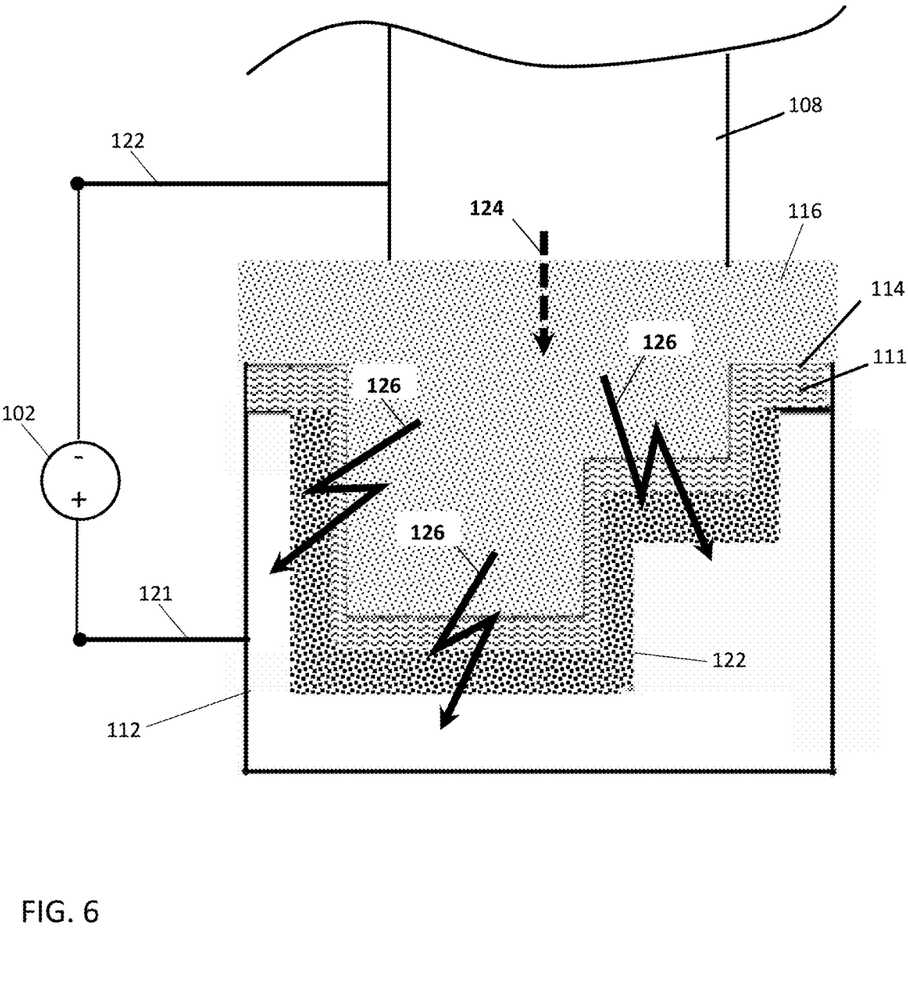
FIG. 6 illustrates the workpiece of FIG. 5 while inducing an electrical discharge across the conformal porous film to erode the rough inner surface of the cavity according to a non-limiting embodiment.

Turning now to FIG. 6, the workpiece 112 is shown undergoing a surface finish improvement process that improves the topography of the rough inner surface 122. The surface finish improvement process includes bringing a tool electrode 108 into contact with the in-situ electrode 116. A cathode terminal 122 is connected to the tool electrode 108 and an anode terminal 121 is connected to the workpiece 112. In at least one embodiment, a voltage potential is generated across the cathode 122 and the anode terminal 121 so as to deliver an electrical current (or electron movement) from the tool electrode 108, which flows through the in-situ electrode 116. In turn, the electrical current 124 flowing through the in-situ electrode 116 induces an electrical discharge 126 across the conformal porous film 114 which erodes the rough inner surface 122. For example, the electrical discharge 126 can ablate bumps from the rough inner surface 122, thereby reducing the irregularities and smoothening the inner surface. The delivery of electrical discharges toward the rough inner surface 122 can be continued until the number of irregularities present on the inner surface 122 is below a threshold value. In addition, the dielectric fluid 111 can be continuously flowed (e.g., pumped) through the conformal porous film 114 to ensure an adequate dielectric interface is present throughout the surface finish improvement process.

Figure 7:
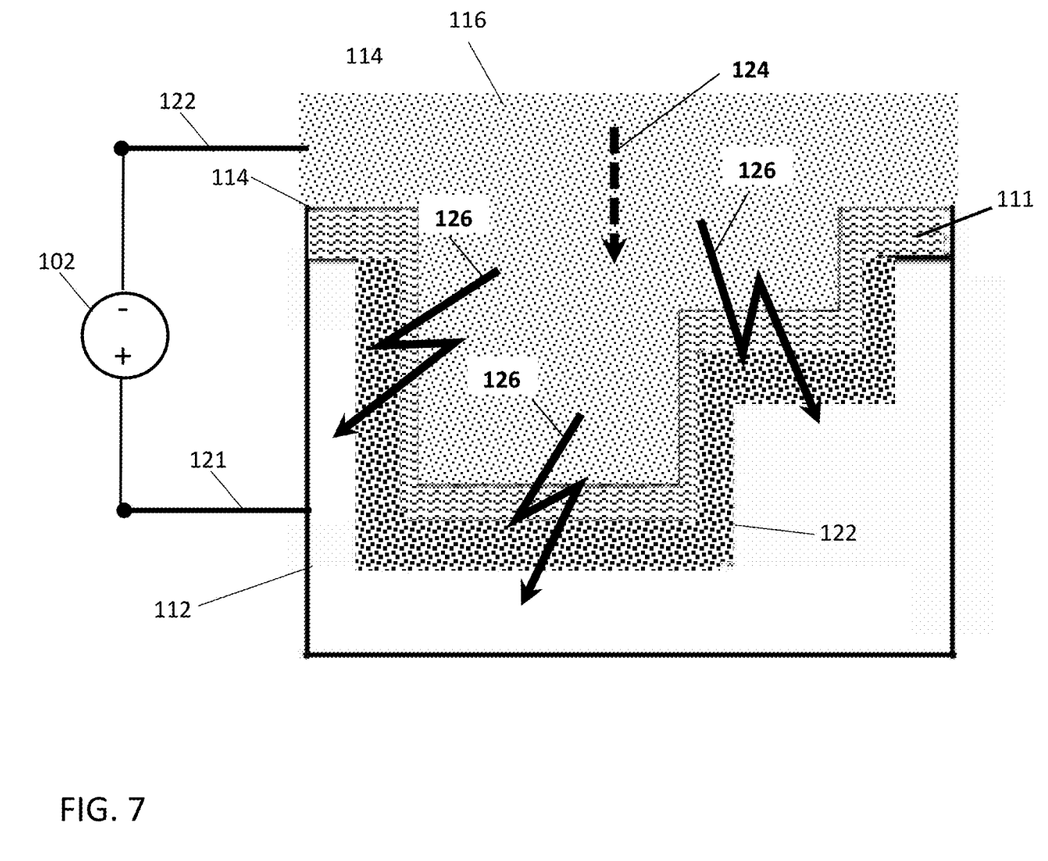
FIG. 7 illustrates the workpiece of FIG. 5 while flowing electrical current through the in-situ electrode to induce an electrical discharge across the conformal porous film to erode the rough inner surface of the cavity according to another non-limiting embodiment.

FIG. 7 illustrates the workpiece 112 undergoing a surface finish improvement process according to another non-limiting embodiment. In this embodiment, the surface finish improvement process is initiated without utilizing the tool electrode 108. For example, instead of utilizing the tool electrode 108 to induce current flow 124 (or electron movement) through the in-situ electrode 116 (which is connected to the cathode 122), the cathode terminal 122 is connected directly to the in-situ electrode 116. Accordingly, a voltage potential across the cathode terminal 122 and the anode terminal 121 induces an electrical current 124 through the in-situ electrode 116 without the need to utilize the tool electrode 108. The electrical current 124 induces an electrical discharge 126 across the porous film 114 which erodes the inner surface 122. As described above, the delivery of electrical discharges toward the rough inner surface 122 can be continued until the number of irregularities present on the inner surface 122 is below a threshold value. This embodiment can be useful, for example, when aiming to induce current flow 124 through an in-situ electrode 116 that may not be accessible by the tool electrode 108.

Figure 8:
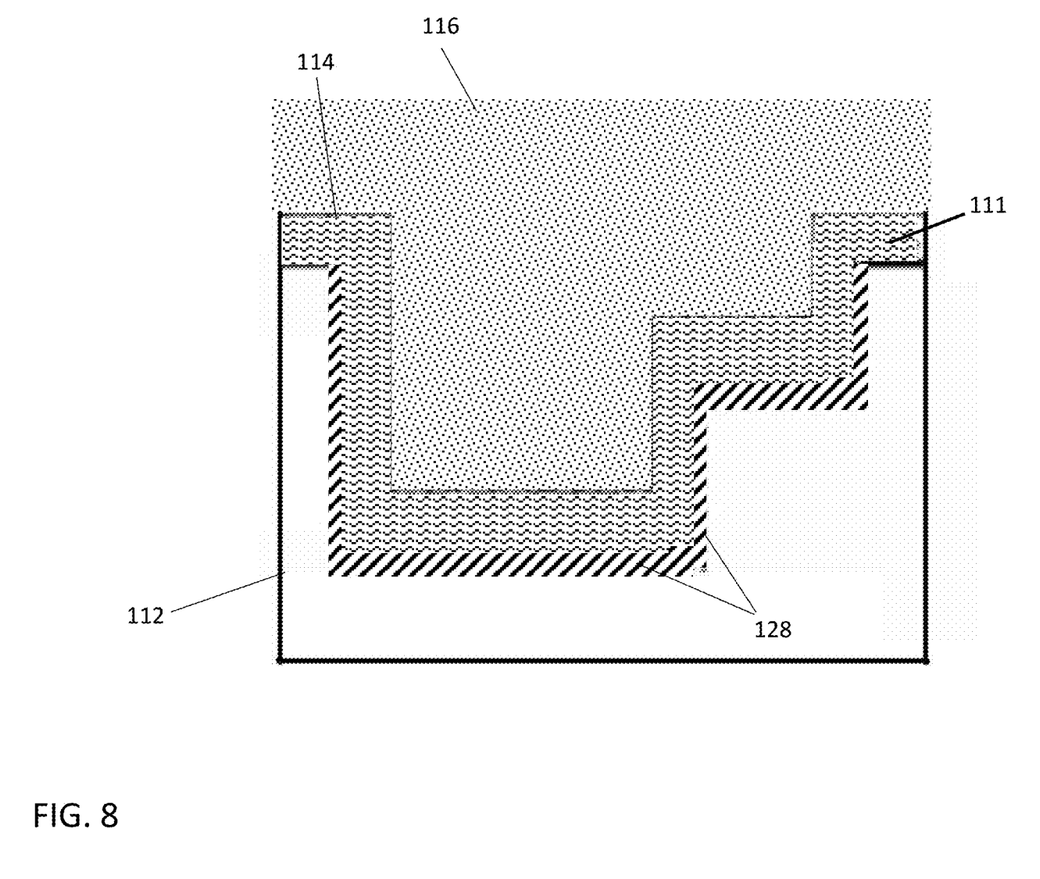
FIG. 8 illustrates the workpiece of FIG. 6 having a smoothened inner surface according to a non-limiting embodiment.
Figure 9:
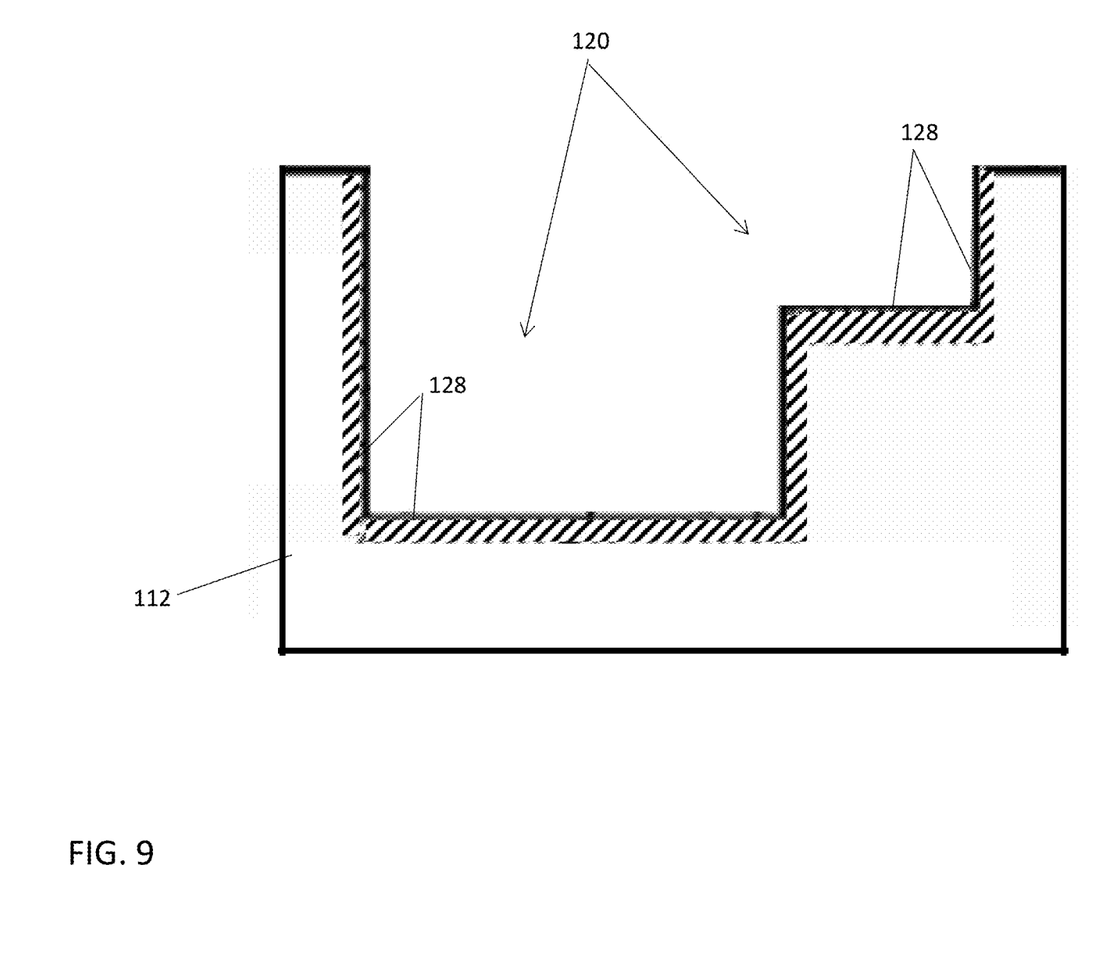
FIG. 9 illustrates the workpiece of FIG. 7 after removing the in-situ electrode to expose the cavity with the smoothened inner surface according to a non-limiting embodiment.

Referring to FIG. 8, the workpiece 112 is shown following either of the surface finish improvement processes described above. As shown in FIG. 8, the previous deviations and irregularities that were present are eroded away, thereby leaving a smooth or polished inner surface 128. In at least one embodiment, the deviations and irregularities previously extending in a direction of a normal vector extending from the inner surface 128 are reduced below a threshold value such so as to define an improved topography of a smoothened inner surface 128. In at least one embodiment, the in-situ electrode 116 and the porous film 114 can be removed after completing the surface finish improvement process as illustrated in FIG. 9. Accordingly, the cavity 120 is re-exposed, but now has an improved surface topology, i.e., a smoothened inner surface 128. Because a smoothened and more uniform inner surface 128 now exists in the cavity 120, the integrity of the workpiece 112 is improved. When the workpiece 112 is implemented in a heat exchanger application, for example, the smoothened inner surface 128 reduces the occurrence of excessive pressure drops, thereby improving the heat exchanger overall cooling efficiency. In addition, the improved topography of the inner surfaces 128 reduces stress points, thereby reducing structural fatigue and improving the overall structural integrity of the workpiece 112.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An additive manufactured workpiece comprising:
at least one cavity having an inner surface;
a dielectric interface in the cavity and conforming to the inner surface; and
an in-situ electrode in the at least one cavity,
wherein the dielectric interface comprises a porous film that lines the inner surface, the porous film containing a dielectric fluid, wherein the in-situ electrode is on the dielectric interface and completely fills the at least one cavity, wherein the dielectric interface is interposed between the in-situ electrode and the inner surface of the workpiece such that in-situ electrode completely covers the at least one cavity and the dielectric interface.

2. The additive manufactured workpiece of claim 1, wherein the in-situ electrode comprises a graphite material.

3. The additive manufactured workpiece of claim 2, wherein the graphite material is a pressurized graphite powder.

4. The additive manufactured workpiece of claim 1, wherein the dielectric fluid includes a fluid that contains a dielectric material is selected from the group consisting of a liquid hydrocarbon, a silicone oil, ethylene glycol, propylene glycol, polyethylene glycol, glycerol, and deionized water.

5. The additive manufactured workpiece of claim 4, wherein the porous film is composed of a polymer material selected from the group consisting of hydrophobic polymers, hydrophilic polymers, and polymer gels.

\* \* \* \* \*